INVENTORS
Elmer W. Madsen
Albert C. Leenhouts
BY
Johnson and Kline
ATTORNEYS

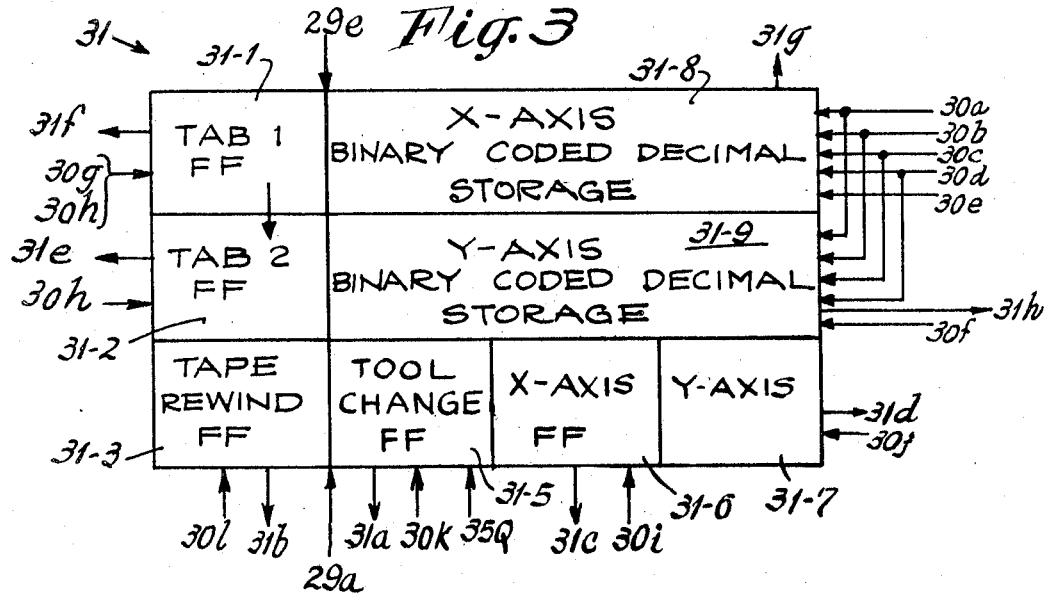
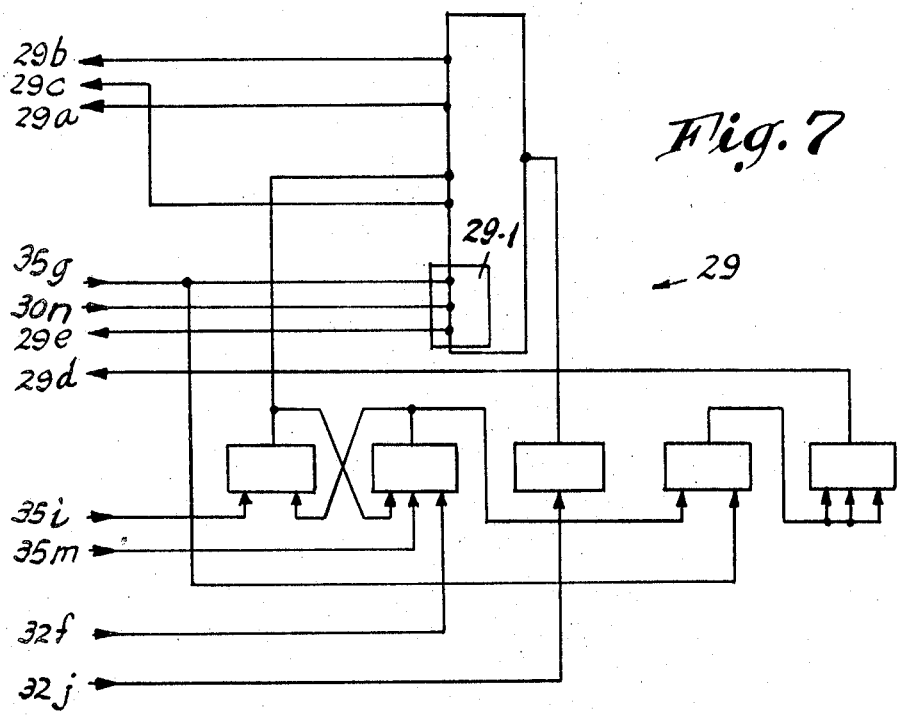

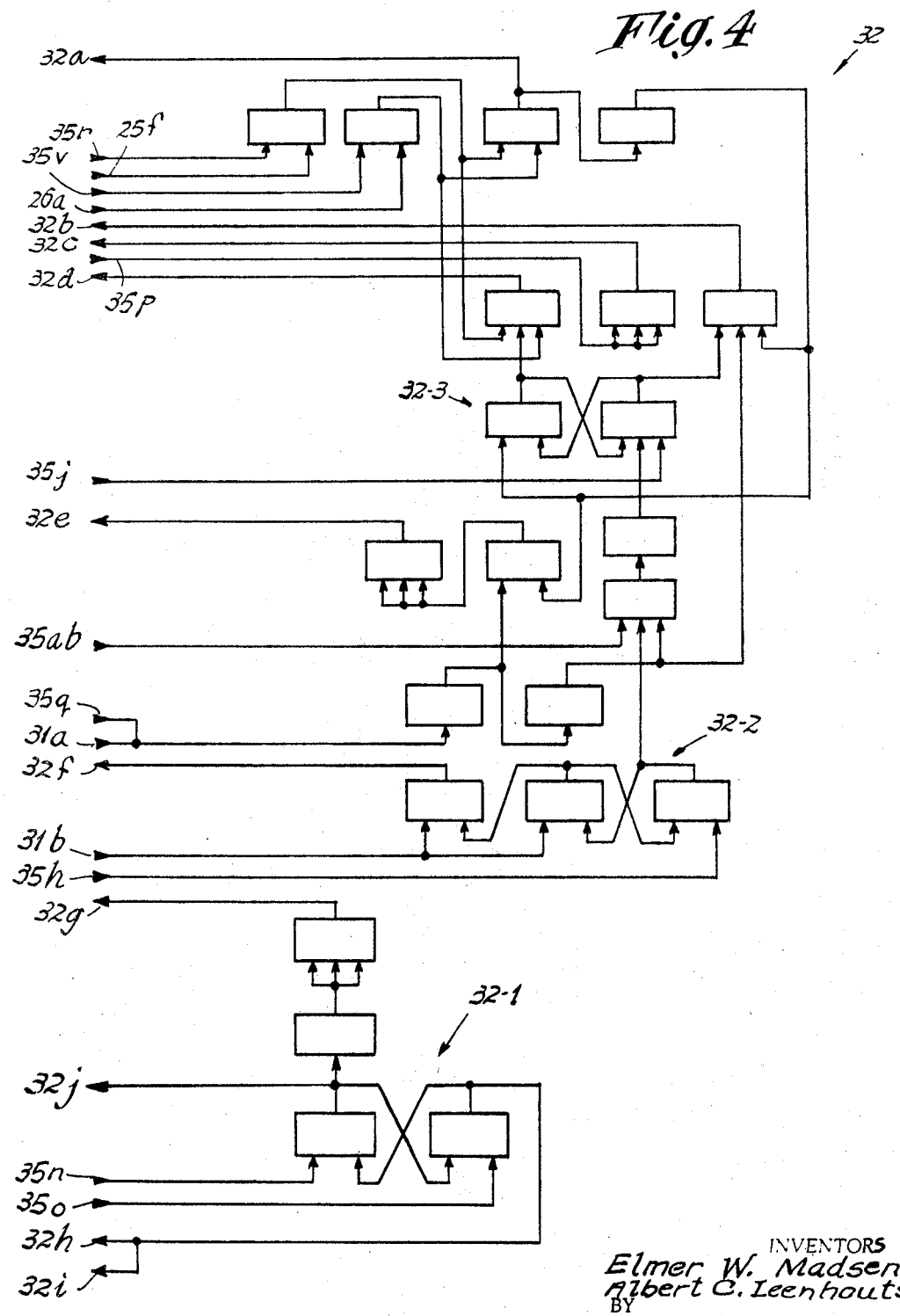

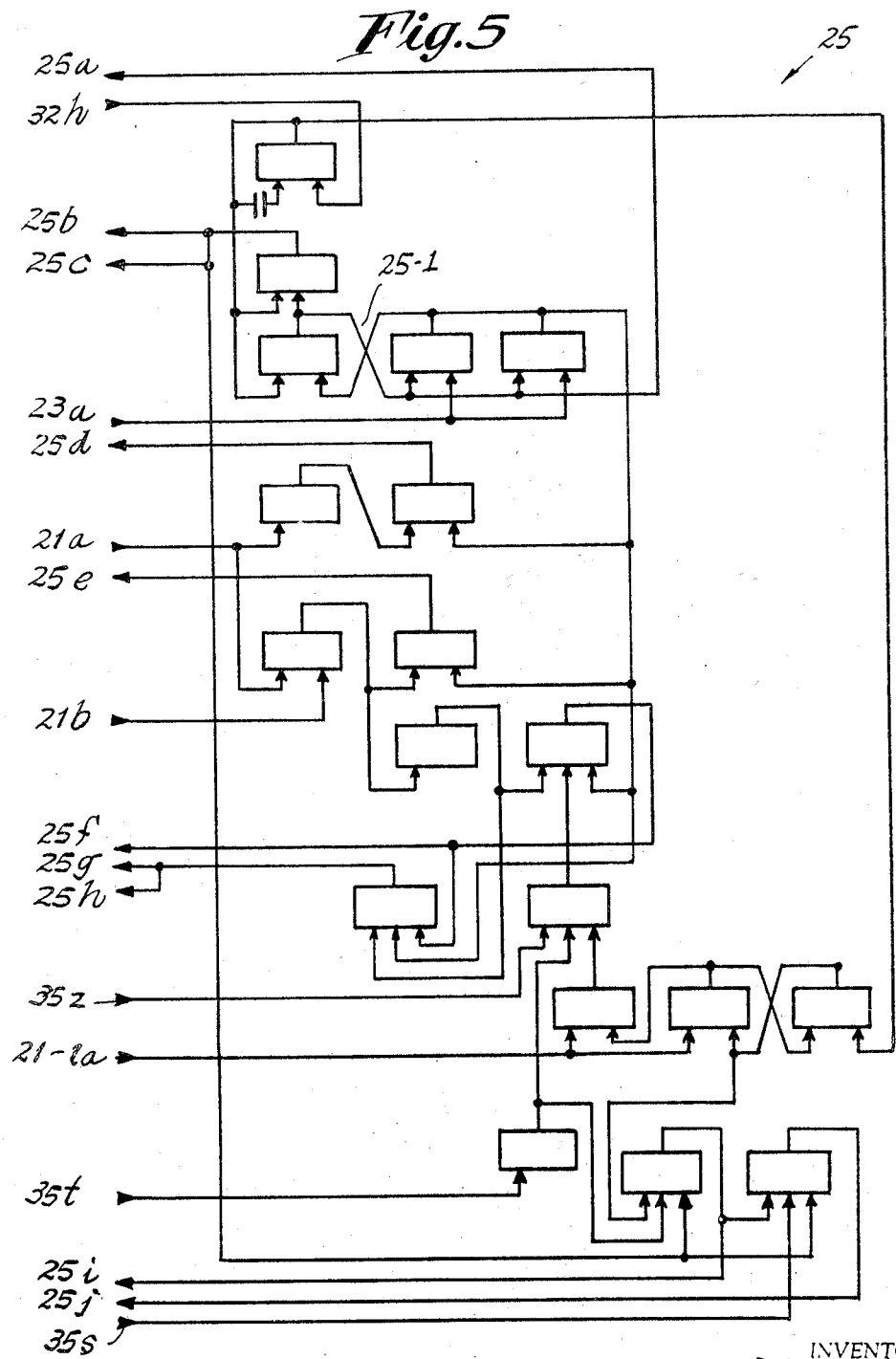

Sept. 9, 1969 E. W. MADSEN ET AL 3,466,515
DIGITALLY PROGRAMMED SERVOCONTROL SYSTEM
Filed Aug. 4, 1965 7 Sheets-Sheet 7

INVENTORS
Elmer W. Madsen
Albert C. Leenhouts
BY Johnson and Klue
ATTORNEYS

United States Patent Office 3,466,515
Patented Sept. 9, 1969

3,466,515
DIGITALLY PROGRAMMED SERVOCONTROL SYSTEM
Elmer W. Madsen, Bristol, and Albert C. Leenhouts, Granby, Conn., assignors to The Superior Electric Company, Bristol, Conn., a corporation of Connecticut
Filed Aug. 4, 1965, Ser. No. 477,133
Int. Cl. G05b *11/00;* H02p *7/18*
U.S. Cl. 318—18                    14 Claims

ABSTRACT OF THE DISCLOSURE

A digital control system for producing movement related to a number of steps of a stepping motor in accordance with information stored on storage means such as punched tape in which the information consists of the desired number of steps, an oscillator provides the number of pulses simultaneously to a motor control and to a counting means, the motor control energizes the motor to produce a step for each pulse received and the counting means counts the pulses and stops the oscillator when the number of pulses supplied equals the number of steps in the information and in which there is a second motor required to move a number of steps called for by the information together with a second oscillator that supplies pulses simultaneously to a second motor control means and a second counting means and in which the second oscillator stops supplying pulses when the number of pulses supplied equals the number of steps called for by the information.

---

It has heretofore been proposed to provide a control system for effecting automatic relative movement between a workpiece with respect to a tool along one or more axes according to information of the movement contained on a punched tape or card. Though these prior systems have been operative to provide for automatically performing operations on a piece of work, they have not been found to be completely satisfactory. One objection has been their complexity which increased the possibility of malfunctioning and the difficulty, time and skill required to obviate the malfunctioning. Another objection inherent with the complexity, was the resultant cost of such control systems. These two objections, though not alone, have been capable of rendering the heretofore proposed systems somewhat unsatisfactory and have also economically and practically narrowed the scope of usage of such control systems.

It is accordingly an object of the present invention to provide a control system which is relatively extremely simple in construction, economical to manufacture and reliable in use and which therefore may be economically and practically employed in a wide range of usages.

Another object of the present invention is to provide a control system of the digital type that employs at least one motor in which a change of energization of the motor provides a determined movement thereof and in which the information for the extent of movement of the motor consists of a number which determines the number of changes of energization to be supplied to the motor.

A further object of the present invention is to provide a control system in which the changes in energization of the motor are capable of being derived from information which may be stored on a punched tape or card and employed to automatically effect work operations.

Another object of the present invention is to provide a control system of the open loop type in which the motor is stopped after the number of changes of energization thereto has been achieved, as indicated on the information means.

Still another object of the persent invention is to provide a control system for automatically relatively moving a work carriage and a tool which includes relatively simple circuitry and interconnections therebetween and also in which the control system may be manually controlled.

A still further object of the present invention is to provide a control system in which auxiliary functions in addition to moving the workpiece may be automatically programmed or manually initiated.

In carrying out the present invention there is provided, in the specific embodiment shown, since it is desired to move a piece of work linearly in a plane along a pair of axes that are perpendicular to each other, namely an X axis and a Y axis, a pair of individually controllable motors. A first motor is connected to move the work along the X axis and the other motor is connected to move the work along the Y axis. Preferably the work is mounted on a carriage capable of independent movement on both axes and translates the motor's rotational movement into linear movement of the carriage as by a screw and nut mechanism. Each motor is actuated to be moved an incremental rotative distance, such as 1.8 degrees for each change in energization thereof, and thus move the carriage linearly along its respective axis a distance related to the ratio between the screw carried by the motor and the nut on the carriage. Each motor may be operated independently and simultaneously to move the carriage and also each motor may be caused to move the carriage in either direction along its axis. A type of motor which is used is more fully disclosed in U.S. Patent No. Re. 25,445, assigned to the assignee of the present invention.

The information for movement of each motor is contained by code punchings in a tape representing the number of changes of energization of the motor which is required to produce the desired movement of the work for the motor and also the direction of movement. The tape is initially read and the number thereon is transferred into a storage means which assumes a condition representative of the number. After both numbers for movement on the X axis and Y axis have been stored in a separate storage means for each, they are then transferred at the proper time to a down counter for each axis. The down counter is a decade counter and is made to assume the same condition as its respective storage means to thus have the condition indicative of the number of changes of energization needed by the motor to effect the desired movement. The motor is then actuated and for each change in energization, the condition of the down counter decreases one condition until its zero condition is reached. At that time further changes of energization of the motor are prevented and auxiliary functions, such as a tool operation, are effected, if, of course, they are programmed on the tape. After completion of the auxiliary functions, a signal is given which resets the storage means to a zero condition and actuates the tape reader to read the information contained in the next block on the tape. The cycle is then repeated to effect the next number of changes of energization for the motors and auxiliary function as programmed by punches or lack of punches on the tape.

In addition to the primary function of moving the work carrier, there is also incorporated in the control system, a signal denoting to the operator that the tool should be changed and also a stop for preventing further operations when the end of the program on the tape is achieved. Furthermore, in order to enable the operator to manually control the movement of the work, there is a manual control station that provides information similar to the information from the tape as to the number of changes of energization of the two motors and enables other auxiliary functions such as a tool operation to be manually controlled instead of automatically controlled.

Other features and advantages will hereinafter appear.

In the drawing:

FIG. 3 is a block diagram of the components in the storage block.

FIG. 4 is a diagram of the logic components and interconnections in the auxiliary sequence and cycle control block.

FIG. 5 is a diagram of the logic components and interconnections for one axis sequence logic block.

FIG. 7 is a block diagram of the components and interconnections of the tape reader drive block.

Figure 1:
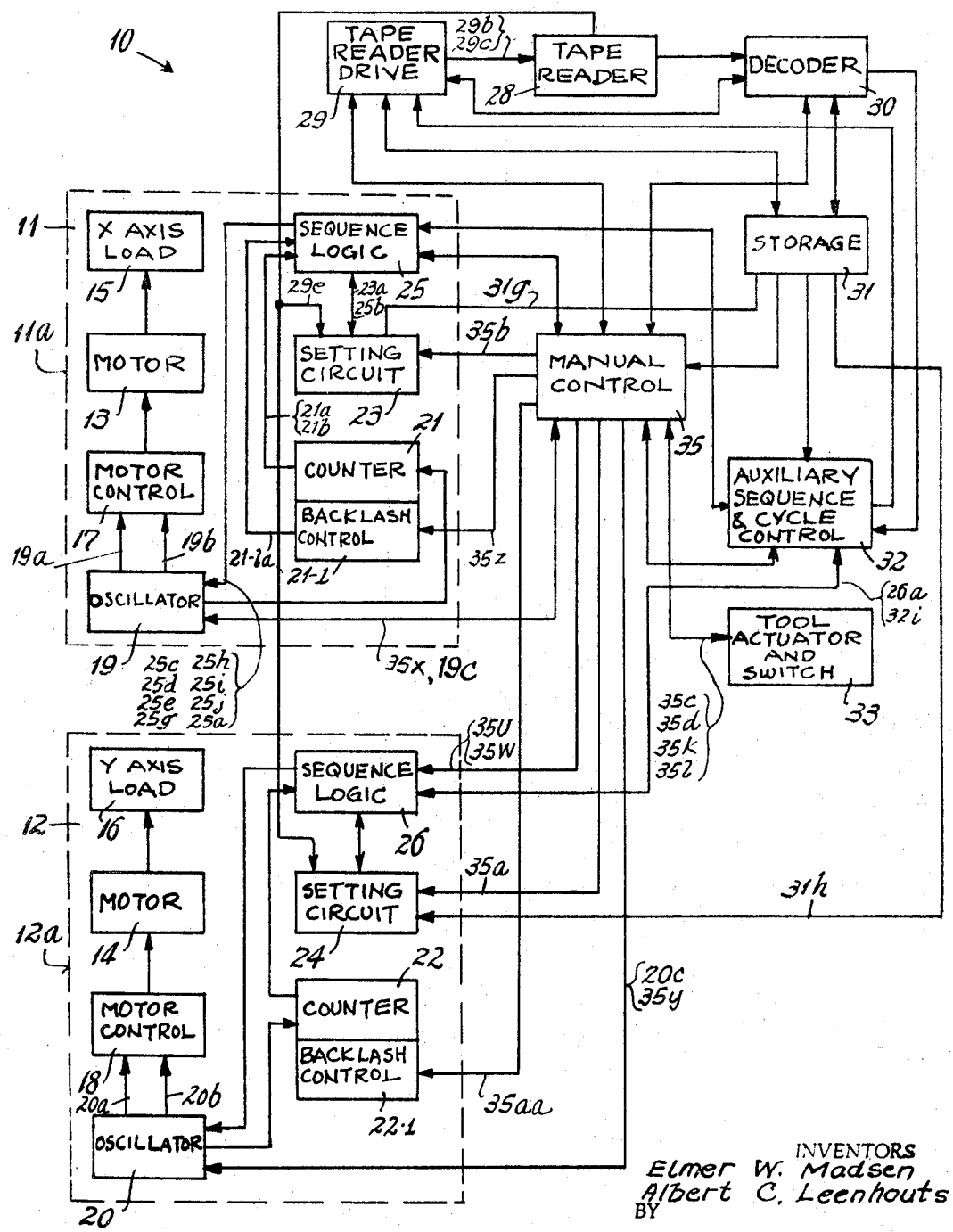
FIGURE 1 is a block diagram of the digital control system of the present invention for providing independent movement along two independent axes.

Referring to the drawing, the digital control system of the present invention in its entirety is indicated by the reference numeral 10 and includes an X axis drive 11 having the components contained within the dotted line block 11a and a Y axis drive 12 having the components contained within the dotted line block 12a. It will be appreciated that if desired a Z axis drive, such as a vertical movement perpendicular to the plane of the X and Y axes, may also be included if desired or that a Z axis may be substituted for either the X or Y axes. The X axis drive and the Y axis drive have identical components and referring to the X axis drive 11, there is provided a motor 13, of the type heretofore referred to, connected to a block 15 denoted X axis load. This block may consist of a work holding carriage and lead screw, with the lead screw being driven by the motor so that rotational movement of the motor effects a linear movement of a carriage along the X axis and thus the rotative movement of the motor may accordingly be translated into linear motion.

The motor 13 is connected to be energized through a motor control circuit 17. The motor 13 is of the stepping type and a change in energization of its windings effects an incremental rotative movement or step thereof. Moreover, the sequence of the change of energization will determine whether the motor will rotate in one direction or the other. The motor control circuit 17 supplies not only the proper change of energization to the motor to produce an incremental movement thereof but also does it in the sequence which produces the desired direction of movement of the motor. The motor in the absence of a change of energization remains stationary at the position to which it was last moved. Every change of energization produced by the motor control circuit is in response to an electric voltage pulse from an oscillator 19. The oscillator 19, as will be hereinafter understood, may be of the adjustable repetition rate type, that supplies pulses at a selected rate within a range of rates as more fully hereinafter set forth.

The oscillator also supplies pulses to a counter 21 simultaneously with pulses to the motor control circuit 17, with the counter 21 being a binary coded decimal down counter having conventional interconnected flip-flop circuits such that for each pulse received from the oscillator it changes its condition to denote one less pulse remaining in the counter. The counter is set by a setting circuit block 23 to have the condition which represents the desired number of changes of energization which the motor is to receive in order to produce the desired movement.

The Y axis drive 12 is identical to the X axis drive 11 and thus has a motor 14 connected to a Y axis load 16 with the motor's changes in energization being produced by a motor control circuit 18 that receives pulses from an oscillator 20. A binary coded decimal down counter 22 also receives pulses from the oscillator and a setting circuit 24 is employed to set the condition of the counter 22.

The X axis drive and the Y axis drive each further contains a sequence logic circuit 25 and 26 respectively with the logic circuit for the X axis being diagrammatically shown in FIG. 5, it being appreciated that the Y axis sequence logic 26 will be substantially identical thereto.

In accordance with the present invention, the directions for automatically effecting the number of changes of energization of each of the motors 13 and 14 and for initiating other functions prior to or subsequent to the completion of the movement, are contained on a tape 27 with the information consisting of punched holes positioned on the tape in a manner hereinafter more fully set forth. The code of the punchings generally conforms to a standard EIA code. The tape 27 is read by a tape reader indicated by block 28 which is sequentially operated by a tape reader drive 29. Information received from the tape in the form of voltage levels on various leads is transferred to a decoder block 30 which passes the information into at least selected areas of a storage block 31 and an auxiliary sequence and cycle control block 32. As it is desired to enable a tool to be operated at the completion of the movement directed by the tape, there is provided a tool actuator and switch block 33 which serves to actuate a tool, such as a drill, that is utilized to drill a hole in a workpiece.

In addition to the use of the punched tape 27 for automatically effecting desired movements and positioning, the control system of the present invention also employs a manual control block 35 by which an operator may effect manual movement and operations independently of the information on the punched tape. The manual control block 35 also serves to indicate to the operator that the operator should perform some function, such as changing the tool, if it is programed on the tape.

Figure 8:
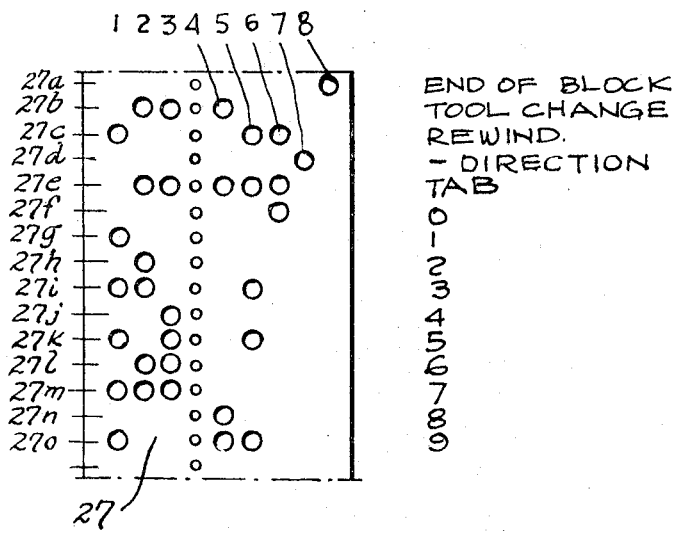
FIG. 8 is a pictorial illustration of a length of tape showing the code of punchings on the tape for each specific piece of information which may be programmed thereto and effect automatic operation of the system.

Referring to FIG. 8, there is shown a length of tape 27 together with the information which may be punched on the tape to effect automatic operation of the control system. The tape is divided into eight longitudinal channels denoted 1 through 8 while pieces of information are contained in transverse rows with each row containing one or more punched holes and constituting one piece of information. Printed opposite each of the transverse rows is the information which the punched holes in the row provide to the control system.

The row 27a has a hole in the number 8 channel and indicates an end of block, i.e., or the end of the information to effect one complete operation which may include movements of the motors and/or a tool operation. The row 27b is utilized to indicate to the operator that the tool should be changed and hence is referred to as a "tool change." Row 27c denotes a rewind command and indicates that when used is the last block of information of the program, with the program consisting of a number of blocks of information. Row 27d consisting of a hole in the channel 7 is the information that effects the opposite direction of movement from that which occurs in the absence of this information or a hole here and in conjunction with one or two tabs controls the direction of movement of either the X axis motor or the Y axis motor. Row 27e is referred to as a "tab" and is employed to indicate that certain subsequent information is to be directed to the X axis drive 11 or the Y axis drive 12. Rows 27f, 27g, 27h, 27i, 27j, 27k, 27l, 27m, 27n and 27o are binary coded notations of the decimal number set forth opposite thereto.

Figure 9:
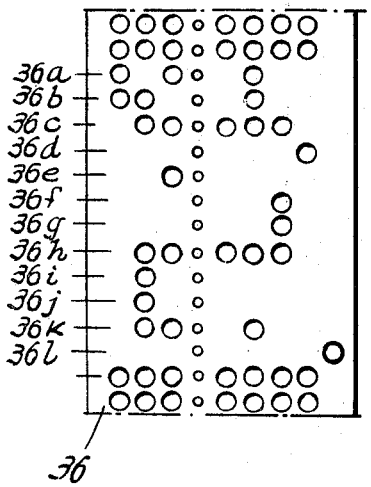
FIG. 9 is a length of tape on which information of one specific movement for each of the two motors is contained.

Referring to FIG. 9, which is a view of a length of tape 36 having one block of information thereon, it will be appreciated after the above, that there is punched thereon rows of informations 36a through 36l with the rows being read by the tape reader in the alphabetical order of the reference characters. Rows 36a and 36b consist of a serial number of the decimal 53 and is merely used to render each block identifiable if it is desired to have each block with an individual identifying character. Row 36c is the first tab in the block and causes transfer of the information contained in subsequent rows 36d, 36e, 36f, 36g to the X axis drive with the information (36d) consisting of an opposite direction of movement of the X axis motor and 400 changes of energization (36e, 36f and 36g) of the motor 13. Row 36h is another tab and as it is the second tab in the block, information subsequent thereto contained in rows 36i, 36j and 36k is transferred to the Y axis drive 12. This information consists of the number 226 which is the number of changes of energization to the Y motor 14. As there is no opposite direction row similar to row 27b the motor will rotate in its normal direction.

The tape reader 28 consists of eight single pole double throw switches with there being a lead from most of the contacts to the decoder block 30. These leads are indicated by the reference character 28–1 and 28–$\bar{1}$, 28–2, 28–$\bar{2}$, 28–$\bar{3}$, 28–4, 28–$\bar{4}$, 28–6, 28–$\bar{6}$, 28–7, 28–$\bar{7}$, 28–$\bar{8}$. The channel from which the leads is in communication is indicated by the numeral after the dash in the reference characters of each lead. To differentiate between the two positions of each switch, a dash over the number is utilized to indicate the normal position of the switch which it assumes in the absence of a hole while the number without a dash is used to indicate that a hole is present in the tape and the switch is in its other position.

Figure 2:
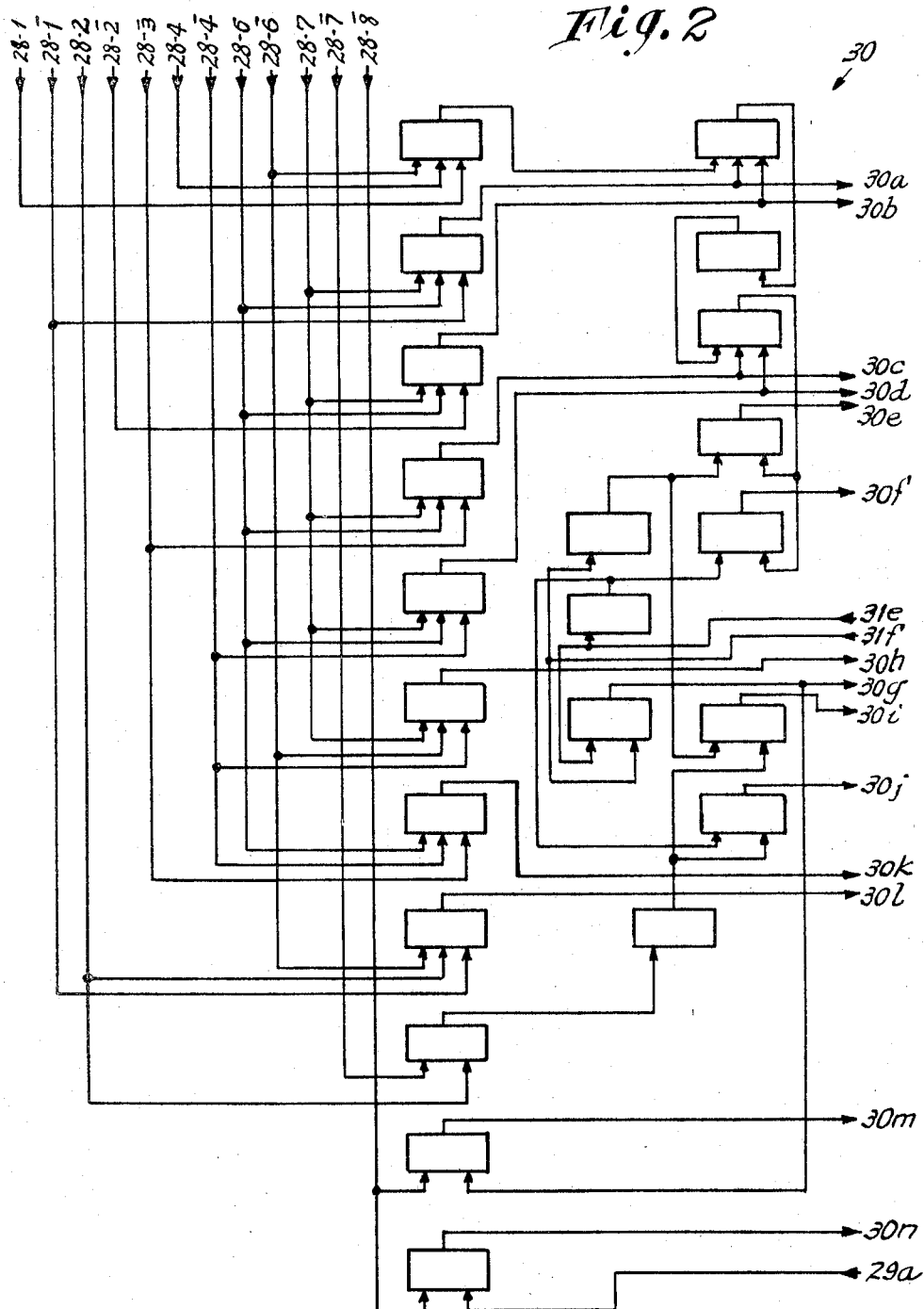
FIG. 2 is a diagram showing the interconnections between logic circuits in the decoder block of the system.

The decoder black 30 is schematically shown in FIG. 2 and consists of a plurality of NOR gates with each of the NOR gates being shown by a rectangle. The connections to each gate are shown and the inputs to the gate are indicated by the arrows on the leads connected and pointing thereto. The information in the leads from the tape reader is a voltage level in each lead of either plus or zero and the NOR gates decode the input information into output information consisting of voltage levels on a known one or more of the decoder block output leads 30a through 30n. Other connections to the decoder block include input leads 31e, 31f and lead 29a.

For convenience the leads interconnecting the various blocks are denoted numerically by the block from which they originate and are differentiated from each other by the use of an alphabetic character.

The storage block 31, specifically shown in block form in FIG. 3, serves to receive information from the decoder block 30 as a block of information is processed by the tape reader and retain the information until all the information in the block is processed and the commands thereof executed. The storage 31 includes a flip-flop 31–1 denoted tab 1 FF and another flip-flop denoted tab 2 FF and indicated by the reference character 31–2. Further flip-flops in the storage block include tape rewind FF 31–3, tool change FF 31–5, minus X axis FF 31–6 and minus Y axis FF 31–7. For storing the number of changes of energization for the X axis, storage block 31 includes an X axis binary coded decimal storage 31–8 and similarly for storing the Y axis number of changes of energization, a Y axis binary coded demical storage 31–9. Each of the storages 31–8 and 31–9 consists of a plurality of flip-flops with preferably a sufficient number to be able to provide a different condition for a four digit decimal number.

Tab 1 FF 31–1 has input leads 30g and 30h thereto for changing its condition to the condition wherein it permits information on leads 30a–30e to be entered into the X axis storage 31–8. For indicating the condition of this flip-flop 31–1, it has an output lead 31f connected to the decoder block 30.

Tab 2 flip-flop 31–2 has an input lead 30h, an input from tab 1 FF 31–1 and an output lead 31e to the decoder block 30 and it functions for the Y axis storage 31–9 to enable information on the leads 30a–30d and 30f to be entered into this storage. The tab 1 FF 31–1 is restored to zero by the lack of a signal on lead 30g which occurs when the next tab command is read in the block, said next tab causing the condition of tab 2 FF to change. Thus for the first tab in the block of information, tab FF 1 is conditioned while for the second tab in the block, tab FF 2 is conditioned and tab FF 1 restored to its original or zero state. Tape rewind FF 31–3 has an input lead 30l and an output lead 31b. The tool change FF 31–5 has an input lead 30k and an output lead 31a. The minus X axis FF and minus Y axis flip-flop, 31–6 and 31–7 respectively, have input leads 30i and 30j and output leads 31c and 31d respectively. The binary coded decimal storage 31–8 and the Y axis decimal storage 31–9 each have an output lead 31g and 31h respectively, each lead consisting of 16 separate conductors so that the condition of each of the flip-flops in each of the decimal storages may have their condition sensed.

Input lead 29e is connected to the storage block 31 and serves when the voltage level is plus in this lead to "clear" the storage of information therein by causing it to assume its zero condition. At this zero condition it is then ready to receive subsequent information in the next block.

The logic diagram for the auxiliary sequence and cycle control 32 is shown in FIG. 4 and includes substantially all NOR gates with however three flip-flops 32–1, 32–2 and 32–3. The auxiliary sequence and cycle control is used basically for controlling the sequence of operations of the motors and tool during the processing of the information that was contained in the block. Thus if functions for example to inhibit a tool from being actuated while the motors are being actuated, inhibit actuation of the tool after a rewind command and other operations as will be hereinafter set forth. The block 32 has output leads 32a–32j and input leads 35r, 25f, 35b, 26a, 35p, 35j, 35ab, 35q, 31a, 31b, 35h, 35n, 35o. The information on the leads 26a and 31i are from and to the sequence logic 26 for the Y axis drive. Each of the output leads is a single conductor except for the lead 32b which is connected to both the manual control 35 and the tape reader drive 29.

The cycle flip-flop is generally indicated by the reference numeral 32–1 and serves to provide the information that the system has executed all the commands in a block. The rewind flip-flop is indicated by the reference numeral 32–2 and is employed when actuated on the lead 31b to prevent further automatic operation until it is reset to its initial condition. It functions after the other information on the block of which it is information, has been executed. The flip-flop 32–3 is interrelated with the operation of the motors and tool to provide the command that the tool is to function or not function and the information that it has or has not functioned to thereby then enable a change of the voltage level on the lead 32b indicating that the operations set forth in the block have been completed thereby changing the condition of flip-flop 32–3 through connections in the manual control 35.

In FIG. 5 there is shown a logic diagram of the position sequence logic block 25 for the X axis drive with block 25 having NOR gates and flip-flops with interconnections therebetween. The logic block 25 is employed only in the X axis and it will be appreciated that logic block 26 is of substantially identical construction for the Y axis drive and of course if another drive such as a Z axis drive were employed it would also require a similar logic block 25 for such a drive.

The logic block 25 functions basically to control the oscillator 19 and the counter 21 with respect to their various modes of operations and to provide a signal when the desired number of changes of energization for just the X axis has been achieved to stop the motor 13. In addition it controls the sequence of the changes of energization and hence the direction in which the motor 13 is to move. The logic block 25 has outputs 25a through 25j and inputs 32h, 23a, 21a, 21b, 35z, 21–1a, 35t and 35s. The leads 25a, 25c, 25d, 25e, 25g, 25h, 25i and 25j are each connected to the oscillator to control the duration between pulses and thus cause the oscillator to supply pulses having a repetition rate determined by the condition of these leads. More specifically the lead 25a when having a positive voltage enables pulses produced by the oscillator to be directed to the motor control 17. The leads 25d, 25e and 25g control the rate of the oscillator 19 and thus the duration between pulses therefrom. The leads 25i and 25j control the path of the pulses from the oscillator to the motor control circuit and depending on the condition of these leads the pulses will appear on either one of the leads 19a or 19b that interconnect the oscillator with the motor control circuit and on which the pulses to the motor control circuit are transmitted. The leads 21a and 21b are connections from the counter 21 and indicate to the logic block 25 the number of pulses remaining to complete the desired number of changes of energization. With this information in a manner disclosed in U.S. patent application Ser. No. 426,633, assigned to the assignee of the present invention, the rate of the changes of energization to the motor may thus be adjusted to cause acceleration during the initial movement and/or deceleration during the final movement thereby enabling the motor to positively control the load.

The logic block 25 is also employed to enable the counter 21 to be set to have the same condition as the X axis binary coded decimal storage 31–8 by causing the oscillator to produce pulses only to the counter 21 along the lead 19c until the counter 21 as shown by the setting circuit 23 has achieved the same condition representative of the number of changes of energization of the X motor that the storage means obtained from the tape 17 (or manual control, as will be hereinafter set forth) as represented by the condition of the binary coded storage 31–8. Thus the logic block 25 includes a counter setting flip-flop 25–1, a lead 25b connected to the setting circuit 23 by which the setting circuit is caused to set the counter 21 to the desired condition and a lead 23a from the setting circuit indicating that the condition has been achieved. Upon completion of the number of changes of energization the condition of the lead 25f is changed and this information is transferred to the auxiliary sequence and cycle control block 32.

The setting circuit 23 is essentially a comparator having a plurality of interrelated NOR gates by which it, when actuated by the sequence logic 25, enables the condition of the counter 21 to be set by pulses from the oscillator 19 to the same condition representative of the number of changes of energization that the condition of the storage means 31–8 represents.

The oscillator 19 is preferably an adjustable frequency oscillator such as a unijunction transistor oscillator. The repetition rate or duration between the pulses produced by the oscillator may be changed by varying the relative values of the resistance-capacitance network that is employed to adjust the condition of the unijunction transistor. For a fuller description of an oscillator circuit which may be used, reference is made to copending application Ser. No. 426,633.

The counter 21 is a binary coded decimal down counter consisting of a plurality of interconnected flip-flops and it preferably has the same capacity, i.e., a separate condition for a decimal number having four digits, as has the storage means 31–8. The counter is connected to the oscillator 19 and receives a pulse on the lead 19c each time a pulse is transmitted to the motor control circuit 17. After the counter has been set to the condition representing the number of changes of energization which the motor 13 is to receive, for each pulse received thereafter the counter will change its condition to be representative of a decimal number, one unit less than it previously represented. The counter will produce on leads 21a and 21b voltage levels which indicate that the counter has achieved a zero condition. Specifically on leads 21a and 21b, the counter is arranged to provide to the sequence logic a zero level in the lead 21a if the condition of the counter represents a decimal number less than 20 and a zero level on the lead 21b if the condition of the counter represents a decimal number that is a multiple of 20. It will be appreciated that when both of these leads have the same zero level that the counter has reached a condition representing zero.

Preferably incorporated in the counter 21 is a backlash control 21–1. The backlash control causes the motor to reach its desired final position always in the same direction irrespective of the direction of the commanded movement of the motor 13. As the motor 13 may be energized to rotate in two directions, when the commanded movement is the same as the finishing movement, backlash control is not necessary. If however the commanded movement is in the opposite direction than the same finishing movement, the backlash control 21—1 adds to the counter a number for example 30 in addition to the number from the tape and then subtracts the same number that it added with the motor consequently finishing the movement oppositely to the commanded direction. The condition of the counter respecting backlash is on the lead 21–1a while backlash may be prevented by a voltage level on the lead 35z. For a fuller understanding of the operation of the backlash control 21–1, reference is made to copending U.S. patent application Ser. No. 378,109, assigned to the assignee of the present invention.

The motor control circuit 17 is employed to translate a pulse received on either the lead 19a or the lead 19b into a change of energization of the motor 13. A pulse on the channel 19a will cause the control circuit 17 to energize the motor 13 in the sequence which rotates the motor in one direction while a pulse on the lead 17b causes the motor to receive a change of energization in the sequence which effects its rotation in the other direction. Pulses do not appear on leads 19a and 19b simultaneously. For a fuller understanding of the motor control circuit 17 reference is made to U.S. Letters Patent No. 3,117,268, assigned to the assignee of the present invention.

The tape reader drive 29 is shown in block and logic form in FIG. 7 and has input leads 30n, 32b and 32f, 35g, 35i and 35m together with output leads 29a, 29b, 29c, 29d and 29e. The output leads 29b and 29c are connected to the coil of the tape reader 28 and serve to pulse the coil to effect an energization of the coil and advance the tape from one row to the next. The lead 29a is connected to both the decoder 30 and all the flip-flop circuits in the storage 31 and supplies a clock pulse thereto which serves to synchronize the motion of the tape reader and the entering of information into the storage 31. The lead 29d is connected to the manual control and serves to provide an indication to the operator that the system is in condition to commence automatic operation of the program on the tape. The lead 29e is connected to storage and functions as above mentioned. The structure of the tape reader drive 29 is commercially available generally without the reset amplifier gate 29–1 and the tape reader 28 is also commercially available. One model of tape reader 28 which may be employed in the present invention is offered by the Tally Register Company and is denoted a 625 tape reader.

Figure 6:
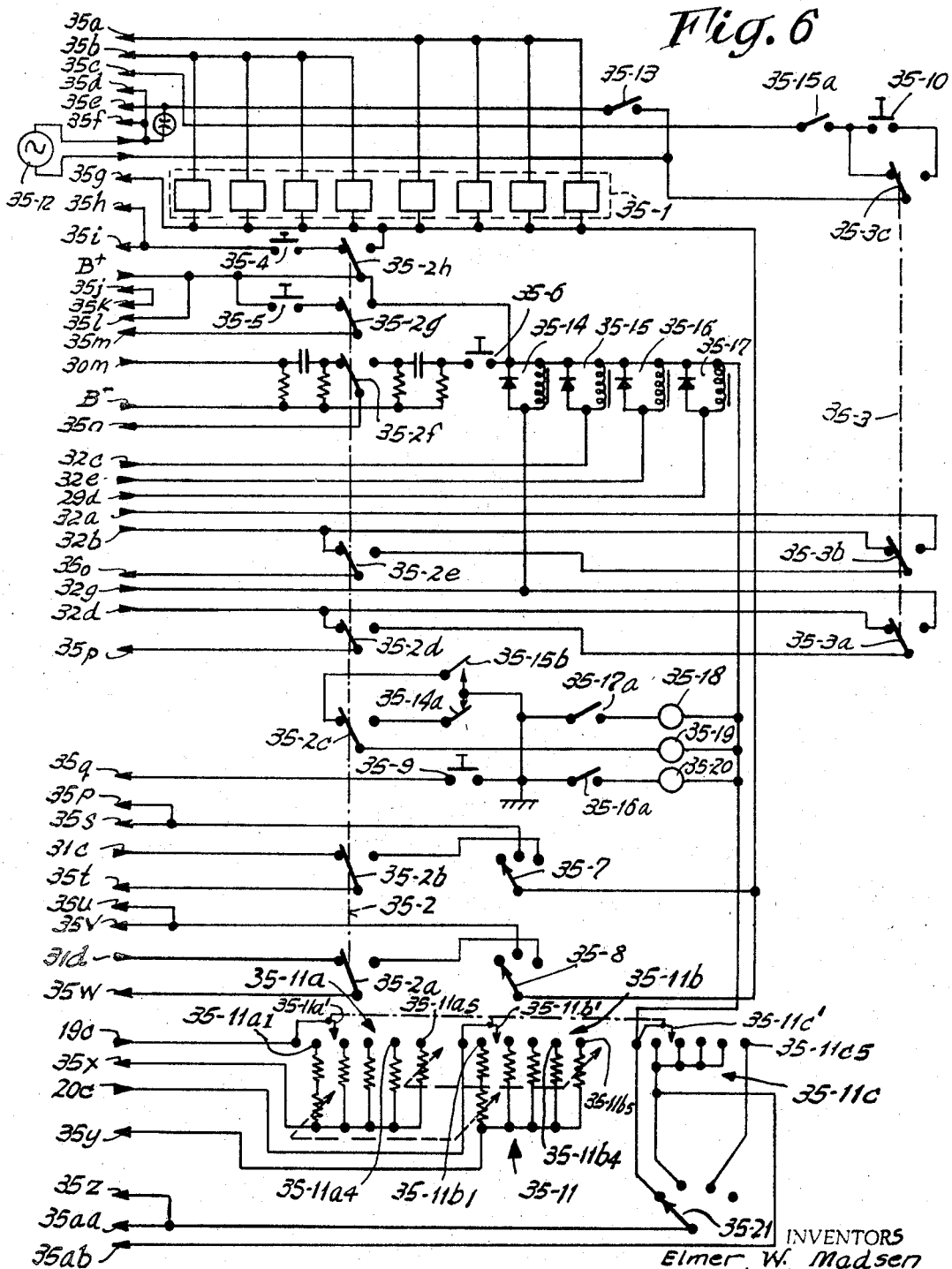
FIG. 6 is a block and electrical schematic diagram of the manual control block.

Referring to FIG. 6, there is shown the schematic diagram of the manual control circuit 35. It contains the controls which enable an operator to select either automatic control of the system by information on the tape 27 or manual control over the various functions and also provides certain indicia of operation to the operator. The manual control 35 includes outputs 35a through 35ab together with inputs 110 v., A.C. 60 cycle, 35–12, B+, 30m, B–, 32a, 32b, 32c, 32d, 32e, 32g, 29d, 31c, 31d, 19c and 20c. The manual control 35 includes 8 rectangles contained within a dotted line indicated by the reference character 35–1 with each rectangle representing a multiple position switch. A user may by setting the switches 35–1 manually control the number of changes of energization which the Y motor 14 may receive through the lead 35a connected to the setting circuit 24 or which the X motor 13 may receive by the connection of the lead 35b to the setting circuit 23. It will be appreciated that the leads 35a and 35b are multileads and may in fact consist of 16 separate connectors. It will be appreciated that the switches 35–1 function similarly to the storages 31–8 and 31–9. For a more specific description of the switches 35–1, reference is made to our copending U.S. patent application Ser. No. 291,074, assigned to the assignee of the present invention.

Further included in the motor control circuit is a manually operated switch 35–2 having 8 switch arms denoted 35–2a, 35–2b, 35–2c, 35–2d, 35–2e, 35–2f, 35–2g and 35–2h. This constitutes the switch that shifts the control of the X and Y motors 13 and 14 to either information contained on the tape for automatic control or to the switches 35–1 for manual control over the number of changes of energization which the motors are to receive.

In addition to the switch 35–2 which sets automatic or manual control over the movement of the motors, there is also provided another multiple switch 35–3 having three switch arms, 35–3a, 35–3b and 35–3c. The switch 35–3, when its switch arms are in the solid line position shown, connects the tool to be automatically operated according to the information on the tape or after completion of a manual movement while if the switch 35–3 is moved to its other position then the operator may manually control the movement of the tool. A normally open push switch 35–4 is provided and serves as the start switch for beginning the program on the tape when the switch 35–2 is in its solid line automatic or tape controlled position. A normally open push button switch 35–5 is interconnected to enable the operator to stop further reading of the tape after its operation when the system is under the automatic control of the information on the tape. A normally opened push button switch 35–6 is interconnected, when closed, for initiating the changes of energization of the motors in the X and Y drives when the switch 35–2 is in the manual position. In addition to the number of changes of energization, a three-position switch 35–7 for the X axis and another three-position switch 35–8 for the Y axis enables the operator to control the direction of movement or the sequence of changes by the positioning of the switch arms in one or the other of their extreme positions but the ability to control the direction being present only when the control system is under manual control. The intermediate position of the switches 35–7 and 35–8 blocks any changes of energization to the motors during manual control.

Whenever a tool change is indicated on the tape and the operator performs the tool change as for example by changing a drill, then in order to reinitiate automatic control, a switch 35–9 is momentarily closed which removes inhibition to further movement by the tool change information on the tape.

The switch 35-3 in its other than solid line position reserves control over the tool to the operator and a normally open push button switch 35–10 requires operation by the operator in order to actuate the tool.

Operation of the tool normally requires that the X and Y motions be completed and their movement stopped and thus a tool operation is not initiated until both of the counters 21 and 22 have achieved a zero condition. In order to enable the control system of the present invention to perform for example a milling operation wherein the tool continuously operates during movement, there is provided a resistance network, generally indicated by the reference character 35–11 together with a selecting switch 35–11a for the X axis and a selector switch 35–11b for the Y axis. The position of the switch arms of switches 35–11a′ and 35–11b′ set the duration between pulses that are transmitted from the oscillator to the motor control circuit by controlling the value of resistance that is in the RC network of the unijunction oscillator. With this structure, the cutting feed rate may be adjusted by controlling the frequency of the changes of energizations to the motor for various operating conditions and material. Thus for example when the switch arms 35–11a′ and 35–11b′ are in contact with the contacts 35–11a1 and 35–11b1 respectively, the rate of changes of energization to the motor is low while when the switch arms 35–11a′ and 35–11b′ are in contact with the contacts 35–11a4 and 35–11b4 respectively then the rate of changes of energization received by the motors is relatively rapid, effecting similar movement of the X axis and Y axis respectively. Contact of the switch arms with the intermediate contacts will enable rates of changes of energization between the low and rapid rates.

The switch 35–11 includes a third switch arm 35–11c′ which is engageable with any one of its five contacts and is mechanically interconnected to move with the switch arms 35–11a′ and 35–11b′. In an operation, such as milling, when the tool is operating simultaneously with the motor control supplying changes of energization to the motor, tool motion is inhibited by the positioning of the switch arm 35–11c′. Thus when the switch arm 35–11c′ engages any one of its contacts except 35–11c5, the B+ lead is connected to the lead 35ab. The lead 35ab connects to the auxiliary sequence and cycle control and prevents tool motion while permitting motor movement.

A further switch 35–21 has four positions and is interconnected with the switch 35–11c and the B+ lead to enable in the solid line position shown, connection of the leads 35z and 35aa to the B+ source to inhibit backlash compensation under all conditions. In its next clockwise positions, the switch 35–21 inhibits backlash compensation only during a milling operation, or inhibits backlash compensation during tool motion or for the most clockwise position, does not inhibit backlash compensation at all.

When the control system is used for positioning and then performing an operation requiring tool motion, such as drilling, the switch arms of the switch 35–11 are positioned to engage the contacts 35–11a5, 35–11b5 and 35–11c5 which disconnect the lead 35ab from the B+ terminal and connects the switches to the X drive oscillator through the leads 19c and 35x and the Y drive 20c and 35y respectively. The contacts 35–11a5 and 35–11b5 are each connected to a variable resistor which is employed to set the normal running repetition rate or duration of the pulses for operating the motor during automatic control, with contact 35–11a5 controlling the X axis and contact 35–11b5 controlling the Y axis. Switch 35–21 controls the application or inhibition of backlash compensation.

Power is supplied to the control system from a source of alternating current, such as indicated by the reference numeral 35–12, with power to the tool actuator of the block 33 being through the leads 35c and 35d. Leads 35e and 35f are connected to a rectifying and filtering system (not shown) for supplying the proper D.C. power to the various blocks including the B+ and B— leads of the manual control. For controlling complete energization of the system there is provided a line switch 35–13 which when closed connects the source 35–12 to the various components of the system.

The manual control 35 includes four relays 35–14, 35–15, 35–16 and 35–17 which are connected to control switches 35–14a; 35–15a and 35–15b; 35–16a; and 35–17a respectively. Some of the relay switches are utilized to control the condition of three indicator lamps 35–18, 35–19 and 35–20. The lamp 35–18 is energized when the system is in condition for the operator to initiate automatic operation by the tape by manual closure of switch 35–4 with the relay 35–17 being energized through the lead 29d whenever the system is not ready for automatic operation, the light 35–19 is used to indicate when manual operations may be performed such as when the system is under automatic motor movement and manual tool operation, the light 35–19 is energized to inform the operator that the motor movement is complete and tool motion should be manually initiated. When both switches 35–2 and 35–3 are in the automatic control position the lamp is not of any particular necessity. However, if the switch 35–2 is in the manual position, the lamp 35–19 indicates to the operator, if not energized, that he may energize the X axis motor 13 and Y axis motor 14 to produce movement as the tool is not in a position to be effected thereby. The lamp has significance only for operation requiring manual positioning and/or a tool operation, such as drilling, while with milling the lamp 35–19 remains unenergized as it provides no significant information to the operator. The lamp 35–20 becomes illuminated whenever the tape is coded to indicate that a tool change is required as by row 27b. This may result after a certain number of operations, such as after drilling 1000 holes or where a different tool is needed at which time the operator should notice that the control system no longer effects movement and by observing that the lamp 35–20 is energized, the tool should then be changed. A voltage level on the lead 32e energizes the relay 35–16 to effect illumination of the lamp 35–20. After changing the tool, the switch 35–9 is manually closed to cause the control system to again perform either automatic or manual control.

In order to more fully understand the present invention, reference is made to FIG. 9 on which a length of tape is shown having one block of information. It is assumed that the previous block has been read and the information processed and then stopped. The tape reader 28 is either actuated by the tape reader drive 29 by a voltage level on the lead 35i by operation of the switch 35–4 for manual starting of the tape control or automatically by a positive signal on the lead 32j which remains until the tape reader has completed reading the block. The tape reader 28 is then actuated to read the first and second rows 36a and 36b but though the decoder block passes this information, the system is not logically set to store or act thereon and accordingly disregards it as it is only a serial number or other number identifying the block. The row 36c, the first tab, passes through the decoder block producing a voltage level on the lead 30h which with a voltage level appearing on 30g by reason of both FF 31–1 and 31–2 being in their zero or normal state conditions the tab 1 flip-flop 31–1 to have its state changed upon appearance of a clock pulse. This in turn permits subsequent information to be transferred into the X axis storage 31–8 and 31–6. The change of condition of the flip-flop 31–1 rendering the X axis storage 31–8 receptive pulse from the lead 29a to the storage 31. With tab 1 flip-flop 31–1 rendering the X axis storage 31–8 receptive to information, the next row 36d is a direction signal indicating the minus X axis direction and is transferred to the flip-flop 31–6 along the lead 30i to change the condition thereof. It will be appreciated that if the direction was positive no direction signal or row would be required.

The next row 36e represents the decimal digit 4 and a voltage level in the leads 30c and 30e sets the X axis storage for this units digit. The next row 36f is transferred through the decoder block along the lead 30e only which in the binary coded decimal storage merely shifts the digit 4 from the units to the tens digit while the next row 36g is also a zero and shifts the 4 from the tens to the hundreds thus setting the X axis storage for a condition representative of the decimal number 400.

The next row 36h is the second tab in the block and the decoder changes the voltage level in the lead 30h which with a zero level on 30g and an activated state of tab 1 FF causes tab 1 to resume its original state and tab 2 FF to achieve its activated state. Thus subsequent information may be passed to the storage 31–9 but not to the storage 31–8. Row 36i represents the decimal digit 2 and as there have been no directions relating to the minus Y axis FF 31–7, it remains in its original state and the information of the numeral 2 is transmitted to the Y axis storage 31–9 along the leads 30b and 30f to cause the storage to assume a condition representative of this number. The next row 36j also represents the decimal digit 2 and is transferred along the leads 30b and 30f, setting the storage 31–9 to the condition representative of the decimal number 22 while the following row 36k, a decimal digit 6, is transferred to the storage along the leads 30b, 30c and 30f and sets the storage 31–9 to the condition representative of the decimal number 226. The subsequent row 36l is an end of block and signifies that all the information in the block has been read. In the particular embodiment shown, a tool motion is automatically performed.

The decoder block, upon being informed of an end of block row and also that either the tab 1 FF or tab 2 FF is not in its rest state as by the voltage level on either of the leads 31e and 31f respectively, transmits a start signal to the auxiliary sequence logic 32 through the lead 30m, switch 35–2f and lead 35n to the auxiliary sequence logic which changes the condition of flip-flop 32–1, the cycle flip-flop. The change in state of the flip-flop 32–1 sends a voltage level over the lead 32b to the tape reader drive preventing further operation thereof. Also a signal in the form of a voltage level is then transferred to the X and Y sequence logic blocks 25 and 26 along the leads 32h and 32i. The sequence logic then sends a signal to the setting circuit (referring specifically only to the X axis block 11a, the Y axis similarly functioning simultaneously) along the lead 25b and to the oscillator 19 on the lead 25c to cause the oscillator to transmit pulses to the counter 21 until the counter has achieved the same condition as the storage 31–8. When the counter has this condition, a signal is transmitted from the setting circuit on the lead 23a which eliminates the voltage level on the leads 25b and 25c and terminates the production of pulses by the oscillator.

With this occurring and with the counter set for a condition representative of a decimal number greater than the decimal number 20, a signal is transmitted to the oscillator on the lead 25a to enable pulses produced to be transmitted to the motor control block 17. The lead 25d has a voltage level by reason of the condition of the counters which causes the oscillator to supply pulses at a rate determined by the variable resistance connected to the contact 35–11a5 (for the X axis) and this lead is made to have a voltage level which then operates the oscillator 19 at a set rate. In addition, as the minus X axis flip-flop 31–6 has a state that is not its rest state, a signal is transmitted through the lead 31c, switch 35–2b and lead 35t to the sequence logic 25 to permit the pulses from the oscillator to pass along the lead 19b to the motor control circuit and effect movement in the minus X axis direction. The lead 25i, when having a positive voltage level, enables passage of the pulses along the lead 19a for causing the sequence of the changes of energization to move the motor 13 in the positive direction while the lead 25j controls passing of pulses along the lead 19b which effects movement in the opposite direction. When the setting circuit of each axis block indicates that the respective counters have been set, then each axis operates independently to begin its supplying of changes of energization to its respective motor.

Each pulse received by the motor control circuit effects one change in energization of the motor 13 and also the pulse is transmitted to the counter 21 to change its condition to a condition of the counter that is one decimal unit less than it previously had. Pulses are transmitted to both the control circuit and counter of the X axis until the condition of the counter 21 indicates that a count exists which is less than 20 at which time a signal is received by the sequence logic 25 along the leads 21a and 21b from the counter. This signal drops the voltage level of the lead 25d and maintains the voltage level of the lead 25e to effect an increase in the duration between the last 20 pulses as the number of pulses remaining decreases. In addition, if the voltage level of the lead 35z is zero as by switch 35–21 being in its solid line position then the backlash block 21–1 functions to add and subtract the same number of pulses to the motor and to change the direction of the complete movement of the tool in the positive direction to its final position. In the final position, the leads 21a and 21b have a zero voltage level which lowers the voltage level on the lead 25e to the oscillator to stop the oscillator from producing further pulses.

Another signal that occurs when the oscillator stops supplying pulses is transmitted along lead 25f to the auxiliary sequence and cycle control which when a similar signal is received from the Y axis sequence logic 26 on the lead 26a conditions the sequence and cycle control 32 to transmit a voltage level on the lead 32d to the manual control. It will be appreciated that each axis produces its changes of energization and generally one will have completed its changes prior to the other. The voltage level through the switch arm 35–2d is transferred to the lead 35p and thence to the auxiliary sequence logic 32 which in turn transmits the voltage level through lead 32c to the manual control 35 which energizes relay coil 35–15 to effect closing of switch 35–15a. Power is then supplied to the tool from the source 35–12, switch 35–3c and leads 35c and 35d for operating an electrical device, such as a tool moving solenoid, the latter being contained in the tool actuation and switch block 33. The tool block 33 includes a switch that has an open condition when the tool is at a rest position and a closed condition when the tool is not at its rest position and thus is closed as soon as the tool begins movement thereby interconnecting leads 35k and 35l until the tool completes its motion and returns to its rest position at which time the connection opens. The interconnecting of leads 35k and 35l effects a change of condition of the tool flip-flop 32–3 by a voltage level being transmitted over the lead 35j to the auxiliary sequence logic 32. When the interconnection between leads 35k and 35l is opened, by the tool returning to its rest position, the voltage level on the lead 35j drops. The tool flip-flop 32–3 when it achieves its changed condition, a cycle completion signal is passed on the lead 32b to the manual control on the lead 35o through the switch 35–2e to auxiliary sequence logic 32 to FF 32–1 which resets it enabling the tape reader to be actuated by an increase in the voltage level on 32f that actuates the drive to begin reading the next block. By the lead 32b having a voltage level, it activates the tape reader drive and initially the tape reader drive reads the end of block signal 36l of the block of information just completed and such a signal is transmitted through the decoder along the lead 30n to the reset amplifier section of the tape reader drive. This produces a voltage level on the lead 29e which is interconnected with all the flip-flops in the storage block and a signal thereon serves to reset all the flip-flops in the storage 31 to their rest condition to thereby render them receptive to information contained in the subsequent block of the tape.

The control system will complete the blocks of information on the tape until the final block is sensed which in addition to motor information contains a rewind row 27c. The tape rewind flip-flop 31–3 will also receive a signal on the lead 30l, change its condition and transmit a signal on the lead 31b to the cycle control 32. The flip-flop 32–2 changes its condition to inhibit tool motion and upon completion of the motor movement a start cycle is sent to the tape reader drive 29 to read the next row and also reset storage 31 on the lead 29e including the rewind FF 31–3. As the next row is an end of block row, it, combined with the change of condition of the rewind FF 32–2, produces a voltage level on the lead 32f which is transmitted to the tape reader drive 29 and prevents further energization of the tape reader. An operator to initiate another automatic cycle is required to rewind the tape on the tape spool and place the tape in the reader in its initial position and then close switch 35–4.

When a tool change is programmed then a voltage level appears on the lead 30k changing the condition of the tool change flip-flop 31–5. A change of this flip-flop changes the voltage level in lead 31a which produces in the lead 32e after completion of motor motions, a voltage level that energizes relay 35–16 to close switch 35–16a and effect illumination of the bulb 35–20. Also it inhibits tool motion and blocks a signal on the lead 32b from being positive. After the operator has changed the tool and pressed switch 35–9, a zero voltage level appears on the lead 35q which shifts the condition of the flip-flop 31–5 to its original condition, eliminating the blocking of 32b and thereby enabling the next block of information on the tape to be read.

In the specific embodiment disclosed herein, the number of changes of energization which each motor receives is exactly the number that is programmed on the tape, i.e., 400 and 226 for the X and Y axis drives respectively. It will be understood that if desired the number on the tape may be a position number with respect to a reference point and that with appropriate accumulating devices, the number may be translated into a number of changes of energization which will produce the desired movement of the motors. The former is sometimes referred to as an incremental system and the latter as an absolute system but in either event, the number stored in the storage 31–8 and 31–9 is representative of the number of pulses which the system receives from the data means and which is representative of the number of changes of energization which the motor requires to produce the predetermined movement.

By the use of the manual control 35 an operator may as heretofore set forth provide for any one of four conditions of operation namely (1) automatic movement and automatic tool motion, (2) automatic movement and manually controlled tool motion, (3) manual movement control and automatic tool motion and (4) manual movement control and manually controlled tool motion.

It will accordingly be appreciated that there has been disclosed a digital control system that may be operated either automatically according to information coded on a tape or other information containing means. The information consists of a number of changes of energizations which are to be supplied to at least one motor with the motor, for each change of energization, producing a known movement. Thus if the motor is interconnected with a work holding carriage, the carriage may be caused to move a total distance which is the product of the total number of changes of energization for producing movement in one direction times the movement produced by each change. The sensing and controlling of only the number of changes of energization by the present control system requires only relatively simple and reliable electrical circuitry. Preferably the system is utilized to control two motors each capable of providing a different movement and while the motors are essentially independently operable, yet many circuits may be common to both thereby further simplifying the system of the present invention.

Variations and modifications may be made within the scope of the claims and portions of the improvements may be used without others.

We claim:

1. A system for normally producing sequentially and automatically a program of predetermined movements of a load comprising an electric motor adapted to be connected to said load to move said load upon movement of the motor, said motor being of the type that provides a known movement for each change in energization thereto; data means for providing a block of information for each predetermined movement with the information for the penultimate block consisting of a number of pulses and for the last block rewind information to prevent further automatic movement of the motor; storage means having a plurality of separate conditions and being interconnected to the data means to be caused to assume the condition representative of the number of pulses of the data means for the penultimate block; oscillator means for producing pulses; motor control means connected to the oscillator means and the motor for translating each pulse received into a change in energization of the motor; counting means having a plurality of separate conditions and changing its condition for each change of energization of the motor; setting means for setting the condition of the counting means to assume the condition representative of the number of pulses in the penultimate block; means connected to the counting means for terminating the changes of energization when the condition of the counting means corresponds to the information of the data means; resetting means operative after the termination of the changes of energization for resetting the storage means to a normal condition; rewind means operative upon receipt of the rewind information for preventing another predetermined number of chanegs of energization to the motor and in which the system includes rewind stop means interconnected to the rewind means for rendering inoperative said rewind means.

2. A system for normally producing a predetermined movement of a load along first and second axes comprising two electric motors, the first motor being adapted to be connected to said load to move said load along one axis upon movement of the first motor, the second motor being adapted to be connected to said load to move said load along the second axis upon movement of the second motor, each of said motors being of the type that provides a known movement for each change in energization thereto; data means for providing a block of information of the predetermined movement along each axis with the information consisting for each axis of a number of pulses; a first oscillator means for supplying the number of pulses called for by the data means for the first motor; a second oscillator means for supplying the number of pulses called for by the data means for the second motor; a first counting means connected to the first oscillator means to receive each pulse, said counting means having a plurality of conditions and changing its condition for each pulse received; a second counting means connected to the second oscillator means to receive each pulse, said counting means having a plurality of conditions and changing its condition for each pulse received; setting means for setting the condition of the first counting means to assume the condition representative of the number of pulses on the data means for the first axis movement and for setting the conditions of the second counting means to assume the condition representative of the number of pulses on the data means for the second axis movement; a first motor control means connected to the first oscillator means and the first motor for receiving each pulse simultaneously with the receipt by the first counting means and for translating each pulse received into a change in energization of the first motor; a second motor control means connected to the second oscillator means and the second motor for receiving each pulse simultaneously with the receipt by the second counting means and for translating each pulse received into a change of energization of the second motor; first terminating means connected to the first counting means for terminating the supplying of pulses to the first motor control means when the condition of the first counting means corresponds to the information of the data means for the first axis and second terminating means connected to the second counting means for terminating the supplying of pulses to the second motor control means when the condition of the second counting means corresponds to the information of the data means for the second axis.

3. A system for normally producing sequentially a first and a second predetermined movement of a load along first and second axes comprising two electric motors, the first motor being adapted to be connected to said load to move said load along one axis upon movement of the first motor, the second motor being adapted to be connected to said load to move said load along the second axis upon movement of the second motor, each of said motors being of the type that provides a known movement for each change in energization thereto; data means for providing a first block of information of the first predetermined movement along each axis with the information consisting for each axis of a number of pulses and a second block of information of the second predetermined movement with the information consisting for each axis of a number of pulses; a first oscillator means for supplying the number of pulses called for by the data means for the first motor for the first block of information; a second oscillator means for supplying the number of pulses called for by the data means for the second motor for the first block of information; a first counting means connected to the first oscillator means to receive each pulse, said counting means having a plurality of conditions and changing its condition for each pulse received; a second counting means connected to the second oscillator means to receive each pulse, said counting means having a plurality of conditions and changing its condition for each pulse received; setting means for setting the condition of the first counting means to assume the condition representative of the number of pulses on the data means for the first axis movement and for setting the condition of the second counting means to assume the condition representative of the number of pulses on the data means for the second axis movement; a first motor control means connected to the first oscillator means and the first motor for receiving each pulse simultaneously with the receipt by the first counting means and for translating each pulse received into a change in energization of the first motor; a second motor control means connected to the second oscillator means and the second motor for receiving each pulse simultaneously with the receipt by the second counting means and for translating each pulse received into a change of energization of the second motor; both of said oscillator means initiating the supplying of pulses to their respective first and second motor control means and said first and second counting means substantially simultaneously; first terminating means connected to the first counting means for terminating the supplying of pulses to the first motor control means when the condition of the first counting means corresponds to the information of the data means for the first axis; second terminating means connected to the second counting means for terminating the supplying of pulses to the second motor control means when the condition of the second counting means corresponds to the information of the data means for the second axis; and resetting means operative after termination of the changes of energization to both the first and second motors for enabling the providing of the information on the second block of information to the counting means.

4. The invention as defined in claim 3 in which there is provided a tool means mounted for movement; the first block of information contains tool operating information and tool operating effecting means for effecting operation of the tool only after the termination of the changes of energization to both the first and second motors.

5. The invention as defined in claim 4 in which the tool means is mounted for movement away from and to a rest position and providing a signal of its location; and means for receiving the tool means location signal and interconnected with the resetting means to prevent operation of the resetting means until the tool means has resumed its rest position.

6. A system for normally producing a predetermined movement of a load along first and second axes comprising two electric motors, the first motor being adapted to be connected to said load to move said load along one axis upon movement of the first motor, the second motor being adapted to be connected to said load to move said load along the second axis upon movement of the second motor, each of said motors being of the type that provides a known movement for each change in energization thereto; data means capable of providing information of the predetermined movement along each axis with the information consisting for each axis of a number of pulses; a first oscillator means for supplying the number of pulses called for by the data means for the first motor; a second oscillator means for supplying the number of pulses called for by the data means for the second motor; a first counting means connected to the first oscillator means to receive each pulse, said counting means having a plurality of conditions and changing its condition for each pulse received; a second counting means connected to the second oscillator means to receive each pulse, said counting means having a plurality of conditions and changing its condition for each pulse received; a first manually settable means capable of selecting a determined movement along the first axis with the information representing a number of pulses; a second manually settable means capable of selecting a determined movement along the second axis with the information representing a number of pulses; a first setting means for setting the condition of the first counting means to assume the condition representative of a number of pulses for the first axis movement; a second setting means for setting the condition of the second counting means to assume the condition representative of a number of pulses for the second axis movement; manual selecting means connected to both manually settable means, the data means and both setting means and having a first position connecting the data means to both setting means to have both counting means assume their respective condition representative of the number of pulses for each axis in the data means and a second position for connecting both manually settable means to both setting means to have their respective counting means assume the condition representative of the number of pulses set by their respective manually settable means; a first motor control means connected to the first oscillator means and the first motor for receiving each pulse simultaneously with the receipt by the first counting means and for translating each pulse received into a change in energization of the first motor; a second motor control means connected to the second oscillator means and the second motor for receiving each pulse simultaneously with the receipt by the second counting means and for translating each pulse received into a change of energization of the second motor; first terminating means connected to the first counting means for terminating the supplying of pulses to the first motor when the condition of the first counting means corresponds to the information of the data means for the first axis and second terminating means connected to the second counting means for terminating the supplying of pulses to the second motor when the condition of the second counting means corresponds to the information of the data means for the second axis.

7. A digital control system for normally producing a determined movement of a load comprising an electric motor adapted to be connected to said load, said motor being of the type that provides a known movement for each change in energization thereto; data means for providing a block of information of the predetermined movement with the information consisting of a number of pulses; storage means having a separate condition for each number of pulses interconnected to the data means to assume the condition representative of the number of pulses; oscillator means for producing only the number of pulses called for by the data means; motor control means connected to the oscillator means and the motor for translating each pulse received into a change in energization of the motor; counting means connected to the oscillator means to receive each pulse simultaneously with the receiving of the pulse by the motor control means, said counting means having a plurality of separate conditions and changing its condition for each received pulse; means connected to the counting means and the oscillator means for terminating the supplying of pulses when the condition of the counting means corresponds to information of the number of pulses provided by the data means and the oscillator means has supplied the number of pulses called for in the information and in which the system includes means for adjusting the frequency of the pulses at least for the intermediate pulses in the number of pulses.

8. The invention as defined in claim 7 in which the system includes a second motor; the data means includes information of a predetermined movement of the second motor with the information consisting of a second number of pulses; the storage means includes a first binary coded decimal storage and a second binary coded decimal storage with each storage having a separate condition for each number of pulses; and means responsive to information on said data means for causing the first storage to assume a condition representative of the number of pulses and for the second storage to assume a condition representative of the second number of pulses.

9. The invention as defined in claim 7 in which the motor control means provides a first sequence of changes of energization and a second sequence of changes of energization; said motor being movable in one direction by the first sequence and in the other direction by the second sequence; said data means including information commanding one direction of movement or the other direction of movement; and said storage means including a circuit having one condition for one direction and a second condition for the other direction.

10. The invention as defined in claim 7 in which the system includes a tool means; means for operating the tool means; the data means includes information commanding operating the tool means; and means in said system for preventing operation of said tool means until the last-named means terminates the supply of pulses.

11. The invention as defined in claim 10 in which the tool means has a rest position; sensing means having a first condition for indicating the tool means at the rest position and a second condition for indicating the tool means being away from the rest position; the data means includes information for a second predetermined movement with the information consisting of a number of pulses; and means for preventing the system from performing said second predetermined movement until the tool sensing means has achieved its second condition and then its first condition.

12. The invention as defined in claim 7 in which the data means includes a subsequent block of information; said second block of information being a rewind command; and means in said system responsive to the rewind command for preventing movement of said motor.

13. The invention as defined in claim 12 in which the system includes a manually operable means and in which said means is interconnected to render upon operation said rewind responsive means ineffective to prevent movement of said motor.

14. A system for normally producing sequentially a first and a second predetermined movement of a load comprising an electric motor adapted to be connected to said load to move said load upon movement of the motor, said motor being of the type that provides a known movement for each change in energization thereto; data means for providing a first block of information of the first predetermined movement with the information consisting of a number of pulses and a second block of information of the second predetermined movement with the information consisting of a number of pulses; storage means having a plurality of separate conditions and being interconnected to the data means to be caused to assume the condition representative of the number of pulses of the data means for the first block; oscillator means for producing only the number of pulses called for by the data means; motor control means connected to the oscillator means and the motor for translating each pulse received into a change in energization of the motor; counting means connected to the oscillator means to receive each pulse simultaneously with the receiving of the pulse by the motor control means, said counting means having a plurality of separate conditions and changing its condition for each received pulse; setting means for setting the condition of the counting means to assume the condition representative of the number of pulses in the first block; means connected to the counting means and the oscillator means for terminating the supplying of pulses when the condition of the counting means corresponds to the information of the data means and the oscillator means has supplied the number of pulses called for in the information; resetting means operative after the termination of the changes of energization for resetting the storage means to a normal condition and for causing said storage means to assume another condition representative of the number of pulses of the data means for the second block and in which the system includes a tool means mounted for movement away from and to a rest position and adapted to perform work; tool position sensing means for sensing the location of the tool means at and away from its rest position; said first block including information effecting movement of the tool means away from its rest position; and blocking means interconnecting the tool position sensing means and the resetting means for preventing operation of the resetting means until the tool means has left and returned to its rest position.

References Cited

UNITED STATES PATENTS

| | | |
|---|---|---|
| 3,015,806 | 1/1962 | Wang et al. |
| 3,069,608 | 12/1962 | Forrester et al. |
| 3,109,974 | 11/1963 | Hallmark. |
| 3,191,111 | 6/1965 | Greene. |
| 3,204,132 | 8/1965 | Benaglio et al. |
| 3,218,532 | 11/1965 | Toscano. |

ORIS L. RADER, Primary Examiner

T. E. LYNCH, Assistant Examiner

U.S. Cl. X.R.

318—28, 162